UNITED STATES PATENT OFFICE.

LORETTA BARTON WELD, OF FALMOUTH, MASSACHUSETTS.

SOLUTION OF QUININE.

SPECIFICATION forming part of Letters Patent No. 379,300, dated March 13, 1888.

Application filed January 28, 1887. Serial No. 225,802. (No specimens.)

*To all whom it may concern:*

Be it known that I, LORETTA BARTON WELD, a citizen of the United States, and a resident of Falmouth, in the county of Barnstable and State of Massachusetts, have invented certain new and useful Improvements in Quinine Preparations, of which the following is a specification.

The use of quinine as a medicinal agent has heretofore been restricted from lack of a non-acid menstruum capable of dissolving a sufficient quantity of a salt of quinine.

While acid solutions of quinine of greater or less strength can be prepared with little difficulty and are suitable for many purposes, they cannot, on account of their irritant character, be used for subcutaneous and hypodermic injections, for local applications, or in some cases internally, of such strength as the character of the disease requires.

In order to secure a non-acid solution of quinine free from the presence of any irritant or objectionable ingredient, I take one of the salts of quinine—as, for instance, the sulphate of quinine—and subject it to the action of chloride of sodium (common salt) in solution in a mixture of alcohol and water.

In making the preparation I first mix the water and alcohol, then dissolve the chloride of sodium therein, and then add the quinine in small quantities until a solution of sufficient strength is obtained; or I may add the quinine salt and sodium salt alternately in small quantities to the mixture of alcohol and water. In this way I have been able to produce a preparation of quinine containing a very large percentage in a clear solution, which preparation is free from the presence of acid or any ingredient which will in the least interfere with the use of the preparation subcutaneously, or as an injection, or for local application, or in its greatest strength internally.

In making the preparation I use the alcohol and water in the proportion of about one part of alcohol to two parts of water; and I have found that any great variation from these proportions results in a precipitation of the quinine.

The proportions of the ingredients will vary according to the salts used and the desired strength of the preparation. Thus with sulphate of quinine and chloride of soda I use the following in some cases: Dilute alcohol in proportion named, one fluid dram; chloride of sodium, one grain; sulphate of quinine, one grain; or dilute alcohol, one fluid dram; chloride of sodium, three grains; sulphate of quinine, six grains. In either case the solution is clear, and is neutral or slightly alkaline in reaction, and it will be seen that the presence of an additional quantity of the sodium salt increases the capacity of the menstruum to dissolve the quinine salt; and I have found that by subjecting the quinine salt to the action of the menstruum of water and alcohol in the presence of the other salt the capacity of the fluid to make a perfect solution of the quinine is greatly increased over its capacity when the second salt is not present, and that a much stronger solution can be obtained than when a hydrochlorate of quinine is subjected to the action of the same menstruum—that is, I have found that the double decomposition of sulphate of quinine and chloride of sodium when effected in a menstruum of alcohol and water is more efficacious in securing a final strong non-acid solution of the quinine than when the decomposition is first effected to secure a hydrochlorate in the ordinary process of manufacture and the hydrochlorate is then dissolved.

Instead of using a mixture of alcohol and water, I may use with greater or less efficacy articles containing both alcohol and water—as whisky or sherry—and other substances—as glycerine—may be present in some cases without preventing the proper solution of the quinine.

Without limiting myself to any precise proportions of ingredients, I claim—

A preparation of quinine consisting of a menstruum composed of alcohol and water, holding in solution a salt of quinine and chloride of sodium, or common salt, substantially as set forth.

In testimony whereof I have signed my name to this specification in the presence of two subscribing witnesses.

LORETTA BARTON WELD.

Witnesses:
RICHARD H. BAKER, Jr.,
RUSSELL A. McCOY.